(12) United States Patent
Iizuka

(10) Patent No.: US 6,466,350 B2
(45) Date of Patent: Oct. 15, 2002

(54) SCANNING OPTICAL SYSTEM

(75) Inventor: Takashi Iizuka, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 42 days.

(21) Appl. No.: 09/790,574

(22) Filed: Feb. 23, 2001

(65) Prior Publication Data
US 2001/0022680 A1 Sep. 20, 2001

(30) Foreign Application Priority Data
Feb. 25, 2000 (JP) .................................... 2000-048749

(51) Int. Cl.$^7$ ............................................. G02B 26/08
(52) U.S. Cl. .................... 359/207; 359/208; 359/216
(58) Field of Search ............................. 359/205–208, 359/216–219

(56) References Cited

U.S. PATENT DOCUMENTS

| 5,621,562 A | 4/1997 | Hama | |
|---|---|---|---|
| 5,748,354 A | 5/1998 | Iizuka | |
| 5,883,732 A | * 3/1999 | Takada et al. | 359/207 |
| 5,896,218 A | * 4/1999 | Iizuka | 359/212 |
| 6,166,843 A | 12/2000 | Iizuka | |

FOREIGN PATENT DOCUMENTS

JP        2-157809        6/1990

* cited by examiner

Primary Examiner—James Phan
(74) Attorney, Agent, or Firm—Greenblum & Bernstein, P.L.C.

(57) ABSTRACT

Disclosed is a scanning optical system that includes a semiconductor laser; a polygon mirror that deflects and scans a light beam emitted from the laser; and an imaging optical system that forms a beam spot on a photoconductive drum. The imaging optical system consists of a curved surface mirror having a positive power mainly in the main scanning direction and an anamorphic lens having a positive power mainly in the auxiliary scanning direction. The anamorphic lens having an anamorphic surface whose optical axis is decentered from a reference ray that reaches the center of the scanning range. The sectional shape of the anamorphic surface in an auxiliary scanning direction being a non-circular curved line to correct coma in the auxiliary scanning direction. The anamorphic surface is a rotationally asymmetrical surface that is defined by a two dimensional polynomial expression.

5 Claims, 4 Drawing Sheets

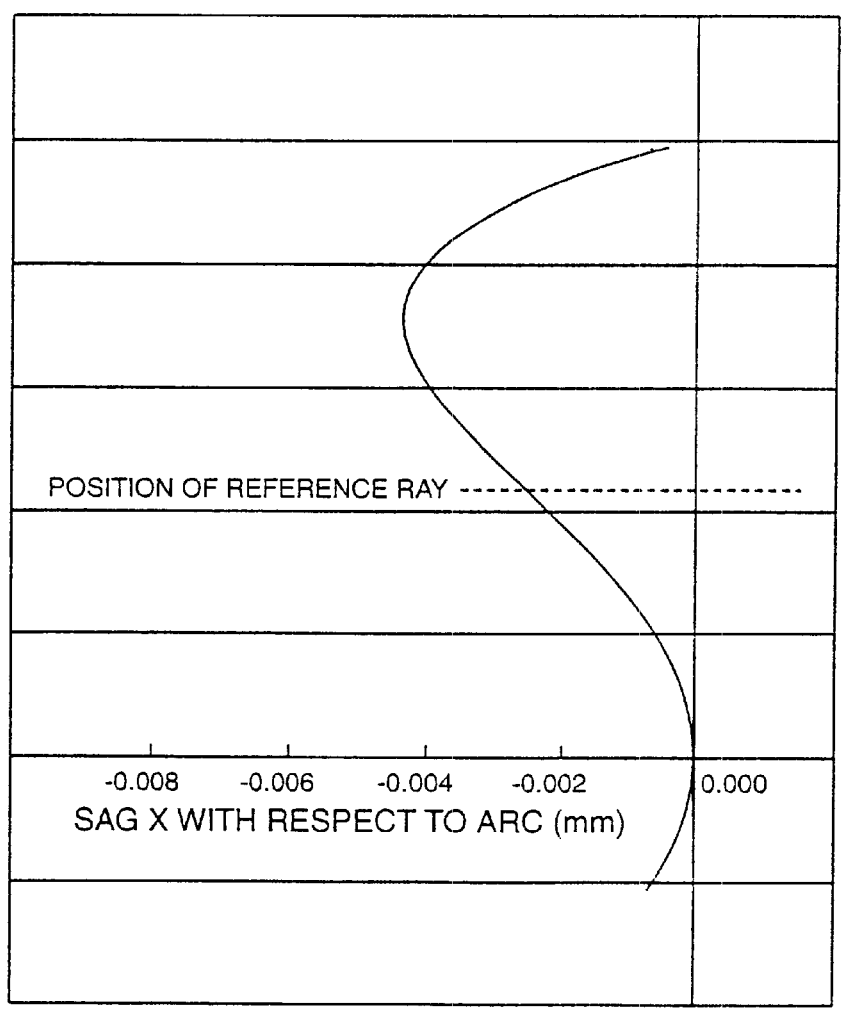

SCANNING OPTICAL SYSTEM

BACKGROUND OF THE INVENTION

The present invention relates to a scanning optical system used for an optical scanning unit such as a laser beam printer. In particular, the present invention relates to a scanning optical system whose imaging optical system includes an anamorphic lens that is decentered from a reference ray that reaches the center of a scanning range on an object surface to be scanned.

Such a scanning optical system is disclosed in U.S. Patent No. 5,748,354. In the disclosed scanning optical system, a laser beam emitted from a laser source is deflected by a polygon mirror and forms a beam spot on an object surface such as a photoconductive drum through an imaging optical system that consists of a curved surface mirror and an anamorphic lens. The beam spot formed on the object surface moves (i.e., scans) on the object surface in a predetermined scanning direction as the polygonal mirror rotates.

In this specification, a scanning direction of the beam spot on the object surface is referred to as a "main scanning direction", a direction perpendicular to the main scanning direction on the object surface is referred to as an "auxiliary scanning direction". Shapes and orientations of powers of respective optical elements will be defined on the basis of these scanning directions. Further, a ray that reaches the center of a scanning range on the object surface is defined as a reference ray.

In the scanning optical system disclosed, since a light beam incident on the polygon mirror and a light beam reflected thereby are separated in the auxiliary scanning direction and the optical path is folded by the curved surface mirror, the size of the optical system is reduced. Further, the optical axis of the anamorphic surface of the anamorphic lens is decentered from the reference ray in the auxiliary scanning direction to compensate skew distortion of the wave-front aberration that is generated since the laser beam is incident on the reflection surfaces of the polygonal mirror at an angle in the auxiliary scanning direction. The sectional shape of the anamorphic surface in the auxiliary scanning direction is an arc, and the power in the auxiliary scanning direction thereof decreases as the distance from the center increases in the main scanning direction. That is, the radius of curvature of the anamorphic surface in the auxiliary scanning direction increases as the distance from the center increases in the main scanning direction.

In the scanning optical system disclosed in the U.S. Pat. No. 5,748,354, however, since the sectional shape of the anamorphic surface in the auxiliary scanning direction is an arc, the optical system is not corrected in coma. As a result, when the laser beam on the anamorphic surface is deviated from a design area in the auxiliary scanning direction due to facet error of the polygon mirror, misalignments of the elements or the like, the focusing point of the laser beam varies in the optical axis direction, which changes the position of the beam spot and the spot size, decreasing printing performance.

FIG. 5 shows focusing points of laser beams incident on the anamorphic surface of the conventional scanning optical system at different heights in the auxiliary scanning direction. A laser beam L0 incident at the design height is focused onto the object surface. On the other hand, laser beams L1 and L2 incident at the different heights from the design height are not focused onto the object surface due to coma. The laser beam L1 is focused behind the object surface and L2 is focused in front of the object surface. As a result, the positions of the beam spots of the laser beams L1 and L2 are deviated from the position of the beam spot of the laser beam L0, and the spot sizes of the laser beams L1 and L2 become larger than that of L0. Such a defect is caused even when an effect of the facet error is compensated by employing a combination of a cylindrical lens and an anamorphic imaging optical system. In the combination, the cylindrical lens is arranged between the laser source and the polygon mirror such that the focal point thereof is located near the reflecting surface of the polygon mirror. The focal point is conjugate with the object surface.

SUMMARY OF THE INVENTION

It is therefore an object of the invention to provide an improved scanning optical system that is capable of keeping the focusing point at the same position on the object surface even if the incident point of a laser beam onto an anamorphic surface varies in the auxiliary scanning direction.

For the above object, according to the present invention, there is provided a scanning optical system, including a light source; a deflector that deflects and scans a light beam emitted from the light source; and an imaging optical system that forms a beam spot on an object surface to be scanned, the imaging optical system comprising an anamorphic lens having an anamorphic surface whose optical axis is decentered from a reference ray that reaches the center of the scanning range on the object surface, and the sectional shape of the anamorphic surface in an auxiliary scanning direction being a non-circular curved line to correct coma in the auxiliary scanning direction.

With this construction, since the coma of the anamorphic lens in the auxiliary scanning direction is corrected, the laser beam is focused at the same point on the object surface even when the incident height of the laser beam onto the anamorphic lens varies, which keeps printing performance.

The deviation of the non-circular curved line from an arc is preferably asymmetrical with respect to the reference ray in the auxiliary scanning direction. Further, a light beam incident on the deflector and a light beam deflected by the deflector may be separated in a predetermined angle in the auxiliary scanning direction. The imaging optical system may include a curved surface mirror having a predetermined power.

Still further, it is preferable that the anamorphic surface is a rotationally asymmetrical surface that is defined by a two dimensional polynomial expression as follows:

$$X(Y,Z) = \frac{Y^2 + Z^2}{r\left(1 + \sqrt{1 - \frac{(\kappa+1)(Y^2+Z^2)}{r^2}}\right)} + \sum_{m=0}\sum_{n=0} B_{mn} Y^m Z^n$$

where $X(Y, Z)$ is a sag, that is, a distance between a point $(0, Y, Z)$ on a tangent plane to the anamorphic surface at the intersection point with the optical axis and a point $(X, Y, Z)$ on the anamorphic surface in the optical axis direction, Y is a height from the optical axis in the main scanning direction, Z is a height from the optical axis in the auxiliary scanning direction, r is a radius of curvature on the optical axis, $\kappa$ is a conic constant, $B_{mn}$ are coefficients.

BRIEF DESCRIPTION OF THE DRAWINGS

FIG. 3 is a graph showing the shape of the anamorphic surface of the scanning optical system of FIG. 1 in the auxiliary scanning direction;

DETAILED DESCRIPTION OF THE PREFERRED EMBODIMENT

A scanning optical system embodying the invention will be described with reference to the accompanying drawings. The scanning optical system of the embodiment is adapted to be used in a laser scanning unit of a laser beam printer. The scanning optical system scans a laser beam modulated by an input signal onto an object surface to be scanned such as a photoconductive drum to form a latent image thereon.

Figure 1:
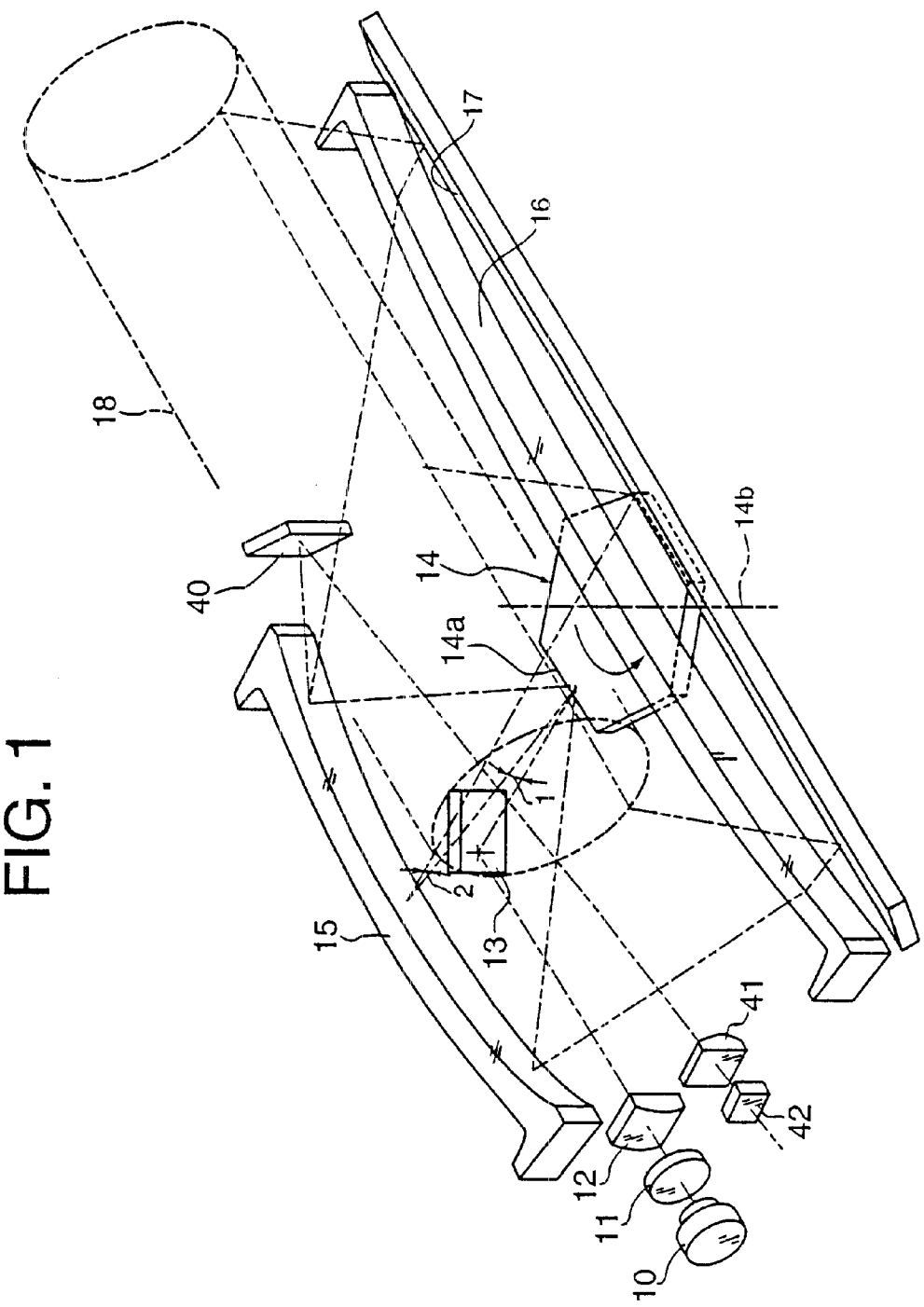
FIG. 1 is a perspective view showing a scanning optical system embodying the present invention.

As shown in FIG. 1, an embodiment of a scanning optical system is arranged such that a diverging light beam generated from a semiconductor laser 10 (light source) is collimated by means of a collimator lens 11. A cylindrical lens 12 converges the collimated laser beam in only the auxiliary scanning direction to form a linear image. The converged beam is then reflected by a flat mirror 13 at a substantially right angle, and is incident to a reflecting surface 14a of a polygon mirror 14.

The polygon mirror 14 rotates at a high speed, thereby deflecting the laser beam. The deflected laser beam is then reflected by a curved surface mirror 15 back toward the polygon mirror side (but above the polygon mirror 14) and transmits through an anamorphic lens 16. The laser beam transmitted through the anamorphic lens 16 is reflected by a fold-over mirror 17 and forms a beam spot on a surface of a photoconductive drum 18 (i.e., an object surface). An imaging optical system, which forms a beam spot, consists of the curved surface mirror 15 and the anamorphic lens 16. The power of the imaging optical system in the main scanning direction is mainly distributed (i.e., distributed more) to the curved surface mirror 15, and the power in the auxiliary scanning direction is mainly distributed (i.e., distributed more) to the anamorphic lens 16. The beam spot scans along a main scanning direction parallel to a generatrix of the photoconductive drum 18 as the polygon mirror 14 rotates.

The laser beam is deflected in the auxiliary scanning direction by the polygonal mirror 14 at a first separation angle θ1, and is subsequently again deflected in the auxiliary scanning direction by the curved surface mirror 15 at a second separation angle θ2, and directed to the anamorphic lens 16 above the polygonal mirror 14.

In the auxiliary scanning direction the laser beam is imaged (focused) in the vicinity of the reflecting surface 14a of the polygon mirror 14 by means of the cylindrical lens 12, and then is re-imaged on the photoconductive drum 18 due largely to the power of the anamorphic lens 16. This compensates the deviation of the scanning line on the photoconductive drum 18 due to the facet error of the reflecting surface 14a of the polygon mirror 14.

The incident side surface of the anamorphic lens 16 is a convex rotationally-symmetrical aspherical surface having almost no power. The exit side surface thereof is a rotationally asymmetrical anamorphic surface whose sag is represented by a two dimensional polynomial expression. Further, the sectional shape of the anamorphic surface in the auxiliary scanning direction is a non-circular curved line to correct coma in the auxiliary scanning direction.

Figure 2:
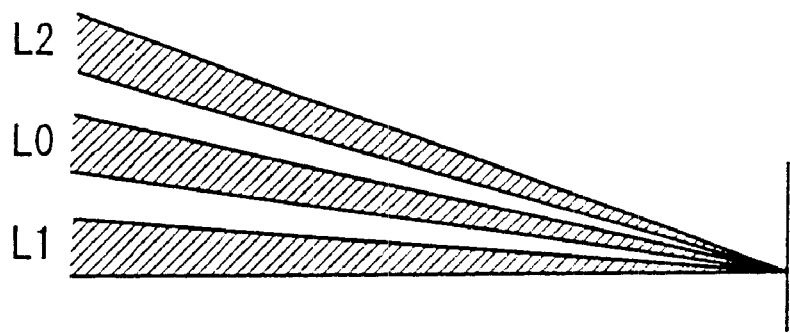
FIG. 2 shows focusing points of laser beams incident on the anamorphic surface of the scanning optical system of FIG. 1 at different heights in the auxiliary scanning direction.
Figure 5:
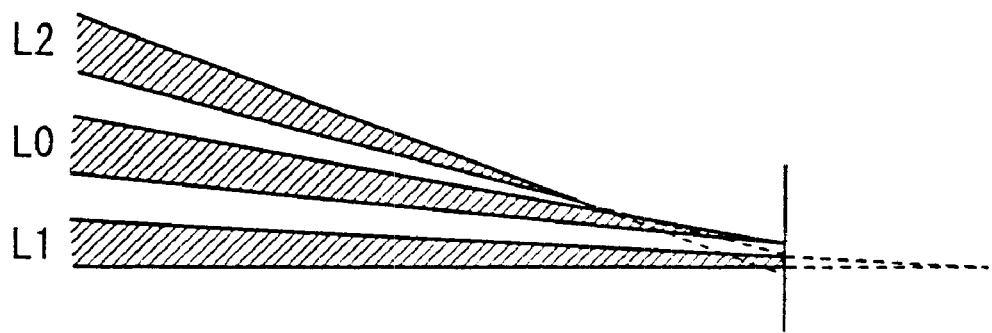
FIG. 5 shows focusing points of laser beams incident on the anamorphic surface of the conventional scanning optical system at different heights in the auxiliary scanning direction.

Since the anamorphic surface of the anamorphic lens 16 is corrected in coma in the auxiliary scanning direction, the laser beam is focused at the same point on the photoconductive drum 18 even when the incident height of the laser beam onto the anamorphic lens 16 varies. FIG. 2 shows focusing points of laser beams incident on the anamorphic surface at different heights in the auxiliary scanning direction. A laser beam L0 incident at the design height and laser beams L1 and L2 incident at the different heights from the design height are focused at the same point on the photoconductive drum 18. Therefore, if the incident height of the laser beam is deviated from the design point due to facet error of the polygon mirror 14 or misalignments of the other optical elements, the position of the beam spot and the spot size do not vary, which keeps the printing performance.

Further, the anamorphic lens 16 is decentered from the reference ray in the auxiliary scanning direction toward the polygon mirror 14 to compensate skew distortion of the wave-front aberration that is generated since the laser beam is incident on the reflection surfaces of the polygonal mirror 14 at an angle in the auxiliary scanning direction. That is, since the laser beam incident on the anamorphic lens 16 scans in accordance with a locus offset from the revolution axis of the incident surface of the anamorphic lens 16, the anamorphic lens 16 bends the laser beam asymmetrically about the optical axis in the auxiliary scanning direction. With this function, the skew distortion of the laser beam can be corrected.

When the laser beam reflected by the curved surface mirror 15 reaches a predetermined point outside the scanning range, the laser beam is reflected by a flat mirror 40 located between the curved surface mirror 15 and the anamorphic lens 16, and is converged onto a photodetector 42 through a cylindrical lens 41 that has a positive power only in the auxiliary scanning direction. The output signal from the photodetector 42 determines a start timing of writing per one scan.

Next, the numerical construction of the embodiment will be described. The following TABLE 1 shows the numerical construction of the scanning optical system of the embodiment on the photoconductive drum 18 side with respect to the cylindrical lens 12.

Symbol K in TABLE 1 represents a scan constant, W is a width of an effective scanning range on the photoconductive drum 18, λ is design wavelength, ry is a radius of curvature (unit: mm) of a surface in the main scanning direction, rz denotes a radius of curvature (unit: mm) of a surface in the auxiliary scanning direction (which will be omitted if a surface is a rotationally-symmetrical surface), d is a distance (unit: mm) between surfaces along the optical axis, n is a refractive index of an element at the design wavelength 780 nm.

The surface numbers 1 and 2 represent the cylindrical lens 12, the surface number 3 is the polygonal mirror 4, the surface number 4 represents the curved surface mirror 15, and the surface numbers 5 and 6 represent the anamorphic lens 16. The anamorphic lens 16 is arranged such that the optical axis thereof is decentered from the reference ray by 2.1 mm toward the polygon mirror 14. The shape of the anamorphic surface at the exit side of the anamorphic lens 16 will be described in TABLE 3.

TABLE 1

K = 135.5 W = 216 mm λ = 780 nm

| Surface Number | ry | rz | d | n |
|---|---|---|---|---|
| 1 | ∞ | 55.424 | 2.00 | 1.48617 |
| 2 | ∞ | — | 113.00 | — |
| 3 | ∞ | — | 50.00 | — |
| 4 | −260.000 | — | 77.80 | — |
| 5 | 5000.000 | — | 4.00 | 1.48617 |
| 6 | 542.000 | (TABLE 3) | 51.60 | — |

The surface of the curved surface mirror 15 (surface number 4) and the incident surface of the anamorphic lens 16 (surface number 5) are rotationally symmetrical aspherical surfaces that are expressed by the following equation:

$$X(h) = \frac{h^2}{r\left\{1 + \sqrt{1 - \frac{(\kappa+1)h^2}{r^2}}\right\}} + A_4 h^2 + A_6 h^6 + A_8 h^8$$

X(h) is a SAG, that is, a height of a curve measured from the tangential plane at the point where the height from the optical axis is h. Symbol r (=ry=rz) is a radius of curvature on the optical axis, κ is a conic constant, $A_4$, $A_6$ and $A_8$ are aspherical surface coefficients of fourth, sixth and eighth orders. The coefficients for the surfaces whose surface numbers are 4 and 5 are shown in TABLE 2.

TABLE 2

| Surface Number | K | $A_4$ | $A_6$ | $A_8$ |
|---|---|---|---|---|
| 4 | 6.00 | $1.300 \times 10^{-7}$ | $-5.500 \times 10^{-12}$ | $1.830 \times 10^{-16}$ |
| 5 | 0.00 | $6.140 \times 10^{-8}$ | $3.330 \times 10^{-12}$ | $-1.350 \times 10^{-16}$ |

The anamorphic surface (surface number 6) is a rotationally asymmetrical surface that is defined by a two dimensional polynomial expression as follows:

$$X(Y, Z) = \frac{Y^2 + Z^2}{r\left(1 + \sqrt{1 - \frac{(\kappa+1)(Y^2+Z^2)}{r^2}}\right)} + \sum_{m=0}\sum_{n=0} B_{mn} Y^m Z^n$$

where X(Y, Z) is a sag, that is, a distance between a point (O, Y, Z) on a tangent plane to the anamorphic surface and a point (X, Y, Z) on the anamorphic surface in the optical axis direction, Y is a height from the optical axis in the main scanning direction, Z is a height from the optical axis in the auxiliary scanning direction, r is a radius of curvature on the optical axis, κ is a conic constant, $B_{mn}$ are coefficients.

The conic constant κ equals 0.00 and the coefficients $B_{mn}$ are shown in TABLE 3.

TABLE 3

| $B_{mn}$ | n = 0 | n = 2 | n = 4 |
|---|---|---|---|
| m = 0 | 0.000 | $-2.690 \times 10^{-02}$ | $1.000 \times 10^{-5}$ |
| m = 2 | 0.000 | $9.000 \times 10^{-07}$ | 0.000 |
| m = 4 | $-1.170 \times 10^{-07}$ | $-7.500 \times 10^{-11}$ | 0.000 |
| m = 6 | $8.570 \times 10^{-12}$ | $3.000 \times 10^{-15}$ | 0.000 |
| m = 8 | $-9.150 \times 10^{-17}$ | 0.000 | 0.000 |

FIG. 3 is a graph showing the sectional shape of the anamorphic surface (surface number 6) defined by the above two dimensional polynomial expression in the auxiliary scanning direction. In the graph, the sag of the surface with respect to the arc whose radius of curvature rz=−19.76 mm in a plane that contains the optical axis. The vertical axis represents a height Z (unit: mm) from the optical axis in the auxiliary scanning direction, the horizontal axis represents the sag X (unit: mm). The height Z of the reference ray is 2.1 mm as shown in a dotted line in the graph. The sectional shape of the anamorphic surface in the auxiliary scanning direction is formed as the non-circular curved line as shown in FIG. 3, the coma in the auxiliary scanning direction can be corrected.

The power of the anamorphic lens 16 in the auxiliary scanning direction varies with the position in the main scanning direction to have a function to correct curvature of field in the auxiliary scanning direction. Further, as described above, the sectional shape of the anamorphic surface is a non-circular curved line to have a function to correct coma. Both of the functions to correct curvature of field and coma require a rotationally asymmetrical surface that is hard to be processed by a lathe. If these functions are shared between the incident surface and the exit surface of the anamorphic lens 16, both of the surfaces are rotationally asymmetrical surfaces, which increases difficulty of the processing. On the other hand, when the anamorphic surface is defined by the two dimensional polynomial expression, the anamorphic surface has the two aberration correcting functions. As a result, the other surface of the anamorphic lens can be a rotationally symmetrical surface that is easy to be processed by a lathe, which reduce the difficulty of the processing.

Figure 4:
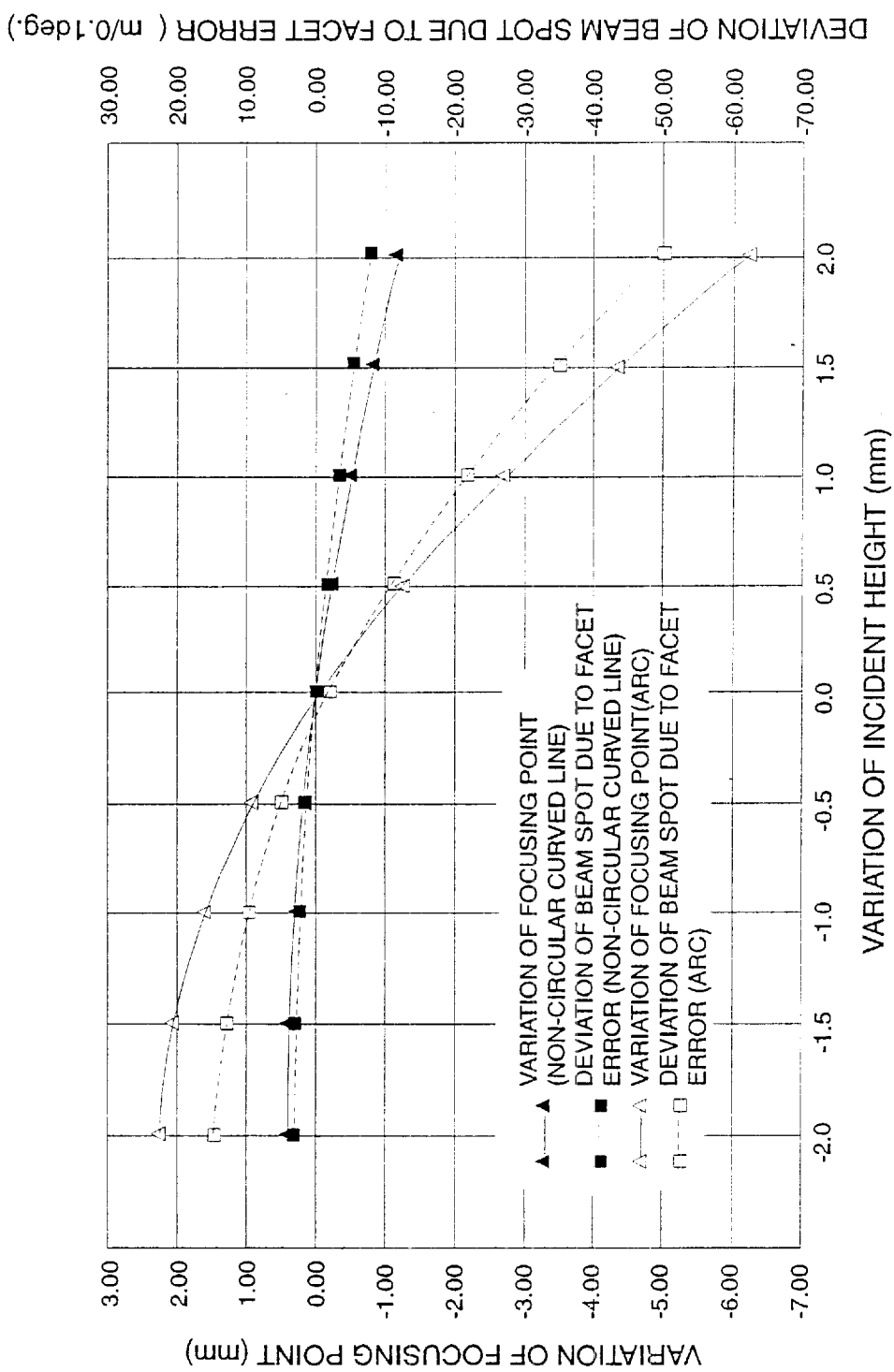
FIG. 4 is a graph showing variations of focusing points in the optical axis direction and deviations of beam spots due to facet error with a variation of the incident height of a laser beam onto the anamorphic surface.

Next, the coma correcting function of the anamorphic surface will be described. FIG. 4 is a graph showing variations of focusing points in the optical axis direction and deviations of beam spots due to facet error with a variation of the incident height of a laser beam onto the anamorphic surface. FIG. 4 gives a comparison of the case when the sectional shape of the anamorphic surface in the auxiliary scanning direction is an arc as the prior art and the case when the sectional shape is a non-circular curved line as the embodiment.

In FIG. 4, solid lines represent the variations of focusing points in the optical axis direction, and dotted lines represent the deviations of beam spots in the auxiliary scanning direction due to facet error (0.1 degrees). The horizontal axis represents the variation of the incident height (unit: mm) with respect to the reference ray, the left vertical axis represents the variation of the focusing point (unit: mm) in the optical axis direction and the right vertical axis represents the deviation of the beam spot in the auxiliary scanning direction.

As shown in FIG. 4, since the coma is corrected by forming the sectional shape of the anamorphic surface in the auxiliary scanning direction as the non-circular curved line, the variation of the focusing point due to the variation of the incident height and the deviation of the beam spot due to the facet error can be reduced. Therefore, the laser beam is focused at the same point on the photoconductive drum 18 even when the incident height of the laser beam onto the anamorphic lens 16 varies, which prevent the deviation of the beam spot and the variation of the spot size, keeping printing performance.

The present disclosure relates to subject matter contained in Japanese Patent Application No.2000-048749 filed on Feb. 25, 2000, which is expressly incorporated herein by reference in its entirety.

What is claimed is:

1. A scanning optical system comprising:

a light source;

a deflector that deflects and scans a light beam emitted from said light source; and an imaging optical system that forms a beam spot on an object surface to be scanned, said imaging optical system comprising an anamorphic lens having an anamorphic surface whose optical axis is decentered from a reference ray that reaches the center of the scanning range on said object surface, wherein the sectional shape of said anamorphic surface in an auxiliary scanning direction is a non-circular curved line to correct coma in the auxiliary scanning direction.

2. The scanning optical system according to claim 1, wherein the deviation of said non-circular curved line from an arc is asymmetrical with respect to said reference ray in the auxiliary scanning direction.

3. The scanning optical system according to claim 1, wherein a light beam incident on said deflector and a light beam deflected by said deflector are separated in a predetermined angle in the auxiliary scanning direction.

4. The scanning optical system according to claim 1, wherein said imaging optical system includes a curved surface mirror having a predetermined power.

5. The scanning optical system according to claim 1, wherein said anamorphic surface is a rotationally asymmetrical surface that is defined by a two dimensional polynomial expression as follows:

$$X(Y,Z) = \frac{Y^2 + Z^2}{r\left(1 + \sqrt{1 - \frac{(\kappa+1)(Y^2+Z^2)}{r^2}}\right)} + \sum_{m=0}\sum_{n=0} B_{mn} Y^m Z^n$$

where X(Y, Z) is a sag, that is, a distance between a point (O, Y, Z) on a tangent plane to said anamorphic surface and a point (X, Y, Z) on said anamorphic surface in the optical axis direction, Y is a height from the optical axis in the main scanning direction, Z is a height from the optical axis in the auxiliary scanning direction, r is a radius of curvature on the optical axis, κ is a conic constant, By are coefficients.

* * * * *